Aug. 3, 1954  M. P. BLOMBERG  2,685,262
TRACTION TRUCK

Filed Jan. 8, 1949  3 Sheets-Sheet 1

Inventor
Martin P. Blomberg
By
Spencer, Willits, Helwig & Baillio
Attorneys

Aug. 3, 1954 — M. P. BLOMBERG — 2,685,262
TRACTION TRUCK
Filed Jan. 8, 1949 — 3 Sheets-Sheet 2

Inventor
Martin P. Blomberg
By Spencer, Willits, Helmig & Baillio
Attorneys

Aug. 3, 1954 M. P. BLOMBERG 2,685,262
TRACTION TRUCK
Filed Jan. 8, 1949 3 Sheets-Sheet 3

Inventor
Martin P. Blomberg
By Spencer, Willits, Helmig & Baillio
Attorneys

Patented Aug. 3, 1954

2,685,262

UNITED STATES PATENT OFFICE 2,685,262

TRACTION TRUCK

Martin P. Blomberg, Hinsdale, Ill., assignor to General Motors Corporation, Detroit, Mich., a corporation of Delaware Application January 8, 1949, Serial No. 69,903

9 Claims. (Cl. 105—190)

This invention generally relates to locomotives and more particularly to locomotive traction trucks and the connection between these trucks and the locomotive cab.

The principal object of the present invention is to provide short wheel base multiaxle traction trucks for a locomotive cab, each including a truck frame, a truck bolster of simple form supported for lateral movement above the frame and pivotally supporting one end of the cab and providing cooperating thrust bearings on the truck frames and bolsters so located with respect to the pivotal connection between the truck bolsters and cab for transmitting driving and braking thrusts that a centering action is applied to the truck frames causing the truck frames to be urged into longitudinal alignment with the cab.

The combined means by which the above object is accomplished and other novel features of the invention will become apparent by reference to the following detailed description and drawings illustrating the invention.

Figure 1 of the drawings is a side elevation view of one end of a locomotive cab and one traction truck with parts shown broken away and in section.

Figure 1:
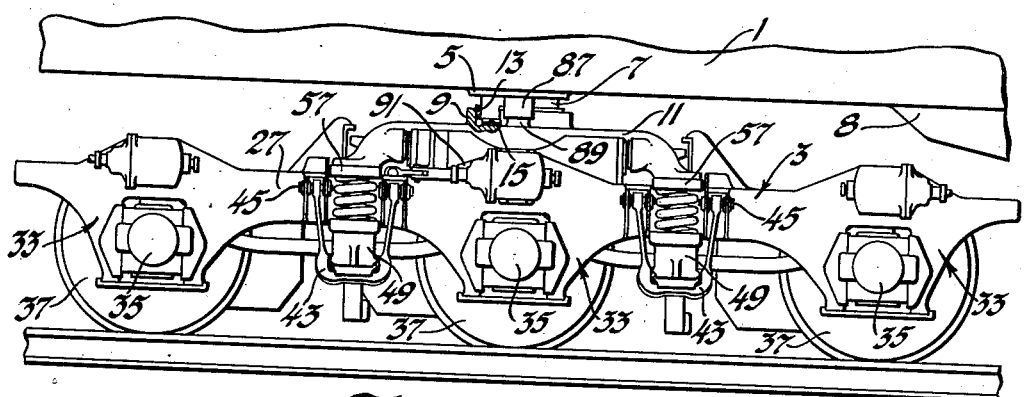

As best shown in Figure 1, one end of a locomotive cab 1 is shown supported on one of a pair of identical traction truck frames generally indicated by the character reference 3. The cab 1 is provided with bolsters 5 forming part of the cab underframe and having center bearings 7 of cylindrical form, shown in Figures 1 and 6 extending into a center bearing 9 of hollow cylindrical form integral with a truck bolster 11. A draft gear 8 shown in Figure 1 is also carried by the cab. The bolster center bearing 9 is provided with an internal bushing 13 and a circular bottom thrust plate 15 engageable by the wall and lower end face of the cab center bearing 7.

Figure 4:
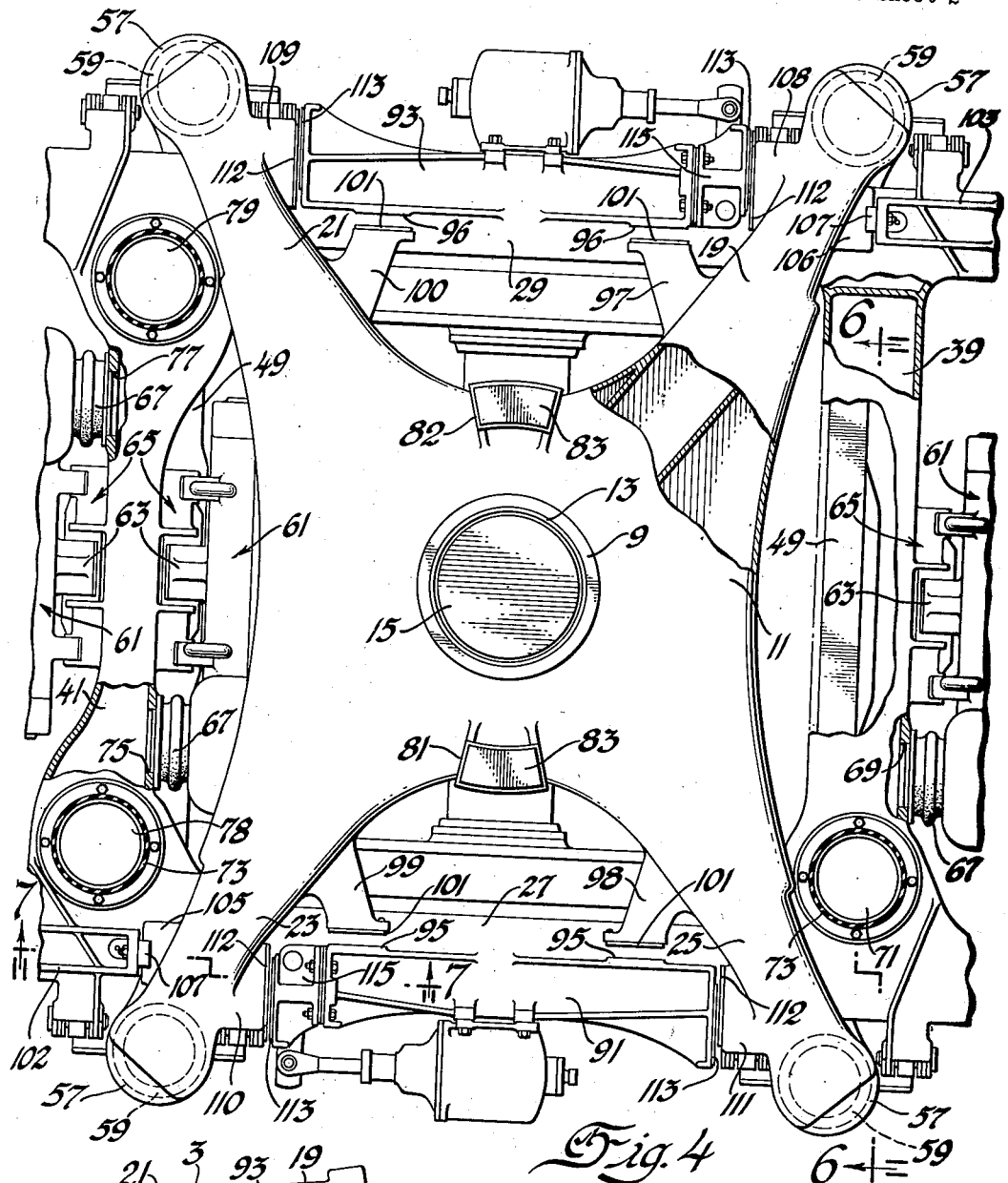
Figure 4 is an enlarged top plan view of the truck shown in Figure 1 with parts shown broken away and in section.

The truck bolster 11, as best illustrated in Figure 4, is of hollow X form, the hollow box section legs 19—21—23—25 of which extend diagonally outwardly from the center bearing portion 9 and over side portions 27—29 of the truck frame 3. Each of the side frame portions 27—29 are provided with downwardly facing central and end pedestal jaw portions generally indicated at 33 in Figure 1 in which journal boxes 35 are mounted for vertical movement. Each journal box 35 is mounted on an end journal portion of each of three truck axles having pairs of traction wheels 37 secured thereto and suitable springs are provided between each journal box and the truck frame side portions in conventional manner. The truck frame is provided with longitudinally spaced hollow transom portions 39—41 extending transversely between the frame side portions intermediate the center and end truck wheels best seen in Figure 4.

Figure 2:
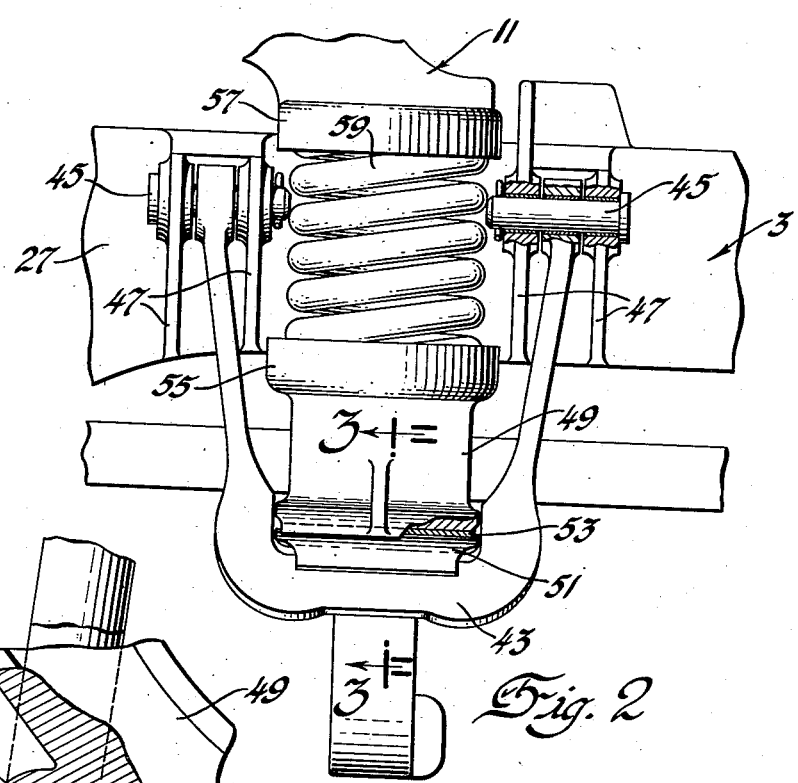
Figure 2 is an enlarged side elevation view of a detail of the traction truck shown in Figure 1 with parts shown broken away and in section.
Figure 3:
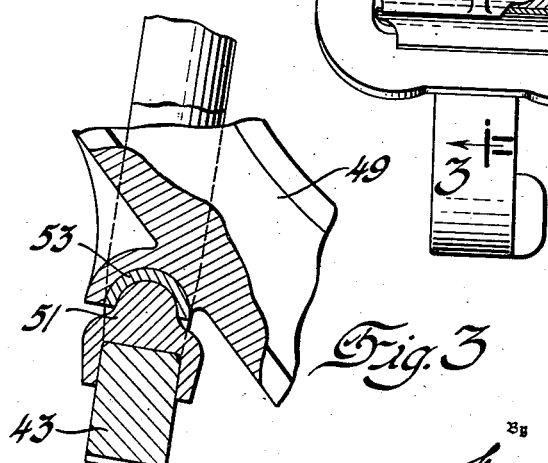
Figure 3 is a transverse sectional view taken on line 3—3 of Figure 2 with parts shown broken away and in section.
Figure 6:
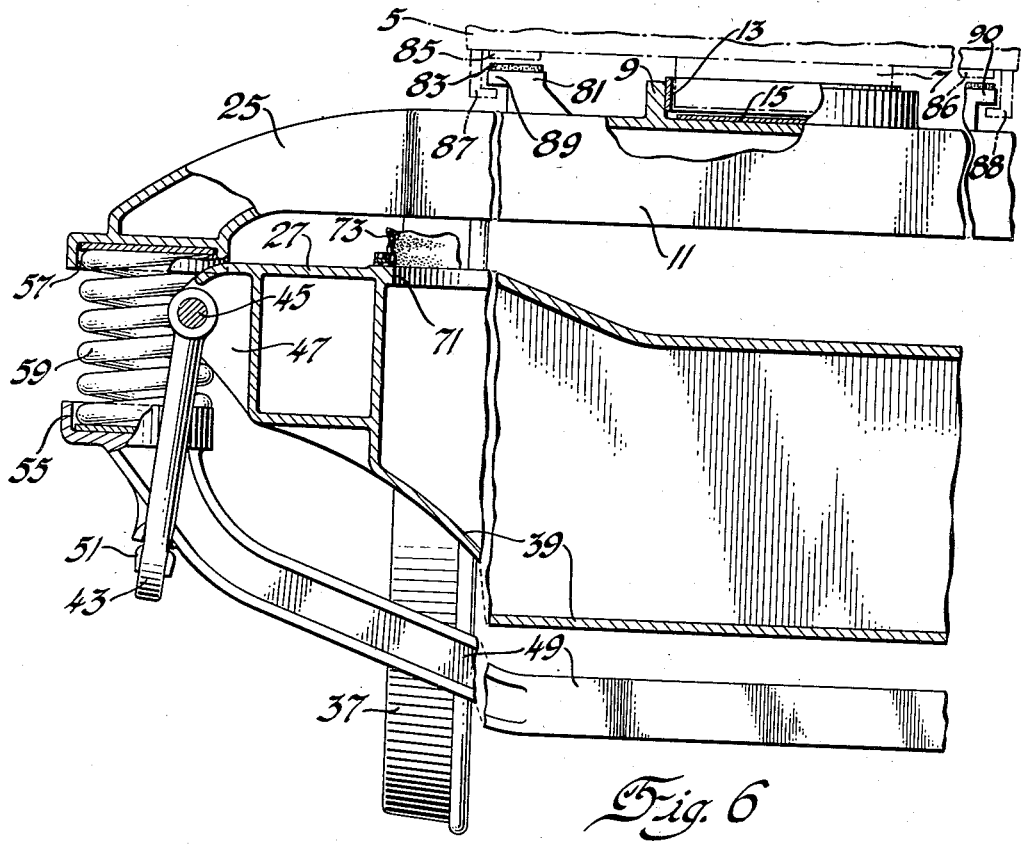
Figure 6 is a transverse sectional view taken on line 6—6 of Figure 4 with parts shown broken away and in section.

Four U-shaped swing links 43 are pivoted at the upper ends by means of pins 45 supported at the ends in longitudinally aligned openings in bosses 47 extending outwardly from the truck frame side portions 27—29 between the adjacent truck wheels for pivotally supporting the opposite ends of each of two spring planks 49 extending transversely below each of the truck transom portions 39—41. As best shown in Figures 2 and 3, a pivot member 51 having a cylindrical upper surface and downwardly extending legs is supported on the lower longitudinal portion of each of the U-shaped swing hangers 43 and a semicylindrical bushing 53 supported in a longitudinal groove in the end of each spring plank 49 pivotally engages the cylindrical upper surface of the pivot member on each swing link. These links 43 are inclined downwardly and outwardly with respect to the truck frame side portions 27—29, as best seen in Figures 3 and 6, to provide transverse swinging and banking movement of the spring planks 49 with respect to the truck frame 3. The outer ends of each of the spring planks 49 are provided with upwardly facing spring seat portions 55 located directly below the outer ends of each of the legs 19—21—23—25 of the truck bolster 11. The outer end of each bolster leg is provided with a downwardly facing spring seat portion 57 and helical springs 59 are seated between the seat portions 55 on the spring planks 49 and the seat portions 57 on each of the bolster legs 19—21—23—25 located directly above.

Three traction motors, generally indicated by the character reference 61 in Figure 4, are resiliently suspended by a nose projection 63 on each. Each motor nose is suspended by nose suspension members of conventional type, generally indicated at 65, on the inner and outer end walls of the truck transom portion 41 and on the outer end wall of the transom portion 39. Each motor is operatively connected to separate axles and is provided with axle boxes, not shown, for support thereon in conventional manner.

The interior of each traction motor 61 is placed in communication by means of a flexible cooling air duct 67 to a separate cooling air outlet opening in the truck frame hollow transom members which are provided with air inlet openings. The truck transom portion 39 is shown in Figure 4 provided with a single air outlet opening 69 in the inner end wall to which one of the flexible ducts 67 is connected and a single air inlet opening 71 in the upper wall to which a flexible duct 73 is connected and extends upwardly to the outlet of a traction motor blower, not shown, located in the cab 1. The other truck transom portion 41 is provided with two cooling air outlet openings 75—77 in the opposite end walls from each of which separate flexible ducts 67 lead to the interior of separate traction motors 61 and this transom portion is also provided with separate air inlet openings 78—79 in the upper wall to which separate flexible ducts 73 also extend upwardly to separate outlets of blowers, not shown, also located in the cab 1.

Figure 5:
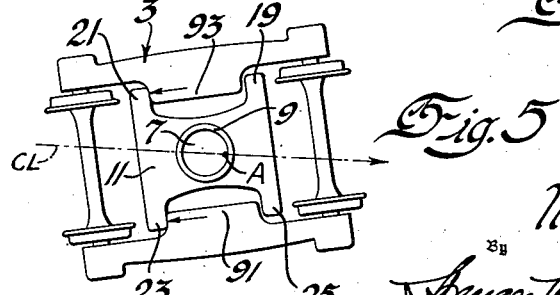
Figure 5 is a diagrammatic top plan view of a truck showing the direction of the forces applied to certain of the parts illustrated in the above figures of the drawings.

The following means are provided to limit vertical separating movement between the cab and truck bolsters: As best shown in Figures 4, 5 and 6, the truck bolster 11 is provided with upstanding side bearing portions 81—82 on opposite sides of the center plate portion 9. Each of these side bearing portions has a wear plate 83 secured to the upper face and these plates are engageable by downwardly extending side bearing portions 85—86 of the cab bolster 5. The cab bolster is provided with safety hooks 87—88 each extending downwardly therefrom and each engageable with the underside of projecting portions 89—90 on the side bearing portions 81—82 of the truck bolster 11.

The following means are provided to limit transverse movement of the truck bolster 11 with respect to the truck frame 3: As best shown in Figure 4, the opposite side frame portions 27—29 of the truck frame 3 are provided with central upstanding projections 91—93 between the legs of the truck bolster 11. Longitudinally spaced inwardly extending pads 95—96 ae provided on each of these projections 91—93 and bosses 97—98—99—100 are provided on each of the outer side surfaces of the truck bolster legs 19—21—23—25 extending outwardly toward these pads 95—96. A wear plate 101 is provided on the outer face of each of these bosses on the truck bolster legs for engagement with the pads 95—96 on the truck frame to limit transverse swinging and banking movement of the bolster relative to the truck frame.

Figure 7:
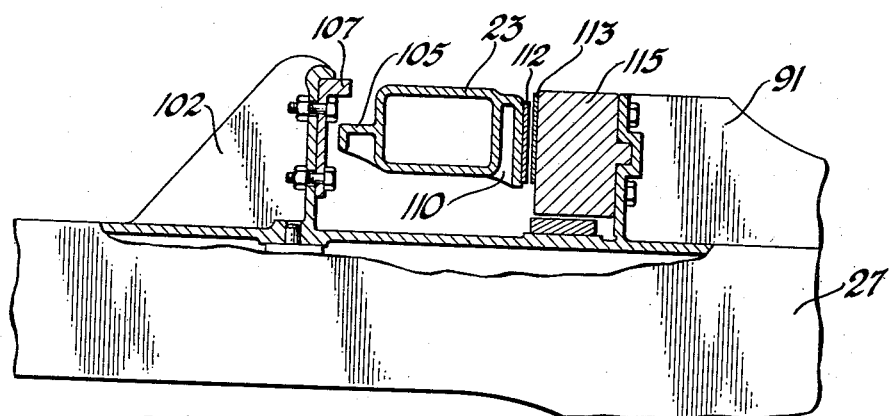
Figure 7 is a longitudinal sectional view taken on line 7—7 of Figure 4 with parts shown broken away and in section.

The following means are provided to limit vertical separating movement between the body bolster 11 and the truck frame: As best shown in Figures 4 and 7 separate upstanding bosses 102—103 are provided on each of the opposite truck frame portions 27—29 and spaced longitudinally outwardly from the diagonally opposite legs 19—23 of the truck bolster. Separate bosses 105—106 extend longitudinally outwardly from each of these bolster legs 19—23 toward the upstanding bosses 102—103 on the truck side frame side portions. A lug 107 is secured to each of these upstanding frame bosses and extends longitudinally inwardly over each of the bosses 105—106 on the bolster legs 19—23 for engagement therewith to limit vertical separating movement between the truck frame and bolster.

Cooperating longitudinal thrust transmitting portions are positioned on the truck bolster legs 19—21—23—25 and central upstanding portions 91—93 of the truck frame at points spaced diagonally opposite the center of the cab and truck bolster center plates 7 and 9. These thrust transmitting portions include projections 108—109—110—111 on each of the bolster legs 19—21—23—25 located above the truck side portions 27—29 and extending longitudinally inwardly toward the transverse center line of the cab and bolster center plates 7 and 9, as best shown in Figures 4 and 7. A wear plate 112 is secured to the vertical inner end face of each of the bolster projections or thrust portions 108—109—110—111. One end of each of the two upstanding central portions 91—93 on the truck frame side portions 27—29 between a pair of bolster legs serve as the thrust portions of the truck frame and are provided with a vertical thrust surface having a wear plate 113 secured thereto and spaced longitudinally inwardly a slight distance from one of the wear plates 112 on a bolster leg. A bracket 115 is secured to each of the other ends of these upstanding truck frame portions 91—93 and another wear plate 113 is secured to the outer vertical end thrust face of the backet and spaced longitudinally inwardly a slight distance from another wear plate 112 of a bolster leg. The truck bolster 11 is accordingly limited to a slight longitudinal movement with respect to the truck frame by contact between the inwardly facing wear plates on the diagonal bolster legs and the outwardly facing wear plates on the frame projections 27—29 therebetween. The truck central frame projections 27—29 at the sides of the truck frame are shown schematically in Figure 5 projecting transversely inwardly between the bolster legs 19—21—23—25. If the driving thrust applied by the traction motors to the truck frame is in the direction of the arrows shown on frame projections, this thrust will be transmitted to the legs 21—23 of the body bolster 11 ahead of the cab and truck center plates 7 and 9. The center line of the cab is shown by the dash and dot line CL in Figure 5 and the force resisting forward movement of the body and train coupled thereto will be applied at the point of contact A between the external cylindrical surface of the cab center plate 7 and internal cylindrical surface of the truck bolster center plate 9. The contact point A is to the rear of the center plates and on the longitudinal center line CL and the resisting force is represented by the backwardly extending arrow on this center line and there will accordingly be a centering force exerted clockwise to urge the longitudinal center line of the bolster into alignment with the body longitudinal center line CL.

Conversely, if the braking force applied to the truck frame and bolster is in the direction of the arrows shown on the truck frame by action of the traction motors serving as dynamic braking generators and the direction of locomotive cab and train movement is represented by the arrows on the longitudinal center line CL of the cab, the braking force is applied backward and to the rear of the cab and truck bolster center plates 7—9 and the force opposing the braking force is at point A on the forward part of the center plates. This likewise causes a centering force to be applied to the truck in the same direction.

I claim:

1. In a traction truck, a truck frame, end and center truck axles having traction wheels secured thereto for supporting the frame, traction motors, each motor having a nose supported on the frame and adapted to be supported on and operatively connected to a separate axle, said frame having longitudinally outwardly facing thrust surfaces extending upwardly from each side and located between the transverse center line and the ends of the frame, a bolster having end portions supported on the frame and extending transversely over the sides thereof adjacent the longitudinally outwardly facing frame thrust surfaces for engagement thereby and a hollow cylindrical center bearing intermediate the end portions of the bolster for pivotally receiving a center bearing portion of a locomotive cab directly over the center truck axle.

2. In a traction truck for a locomotive cab, a plurality of driving axles having attached traction wheels, a truck frame supported on the axles and provided with a pair of longitudinally spaced transom portions and side portions having upstanding centrally located thrust transmitting portions extending longitudinally between the transom portions, and a truck bolster having a cup shaped center bearing portion for pivotally supporting a locomotive cab and legs extending diagonally from the center bearing and transversely over each of the frame side portions adjacent the opposite ends of each of the thrust transmitting portions of the frame for contact thereby, the projecting ends of each of said bolster legs being supported on the outer sides of the frame side portions.

3. In a traction truck for a locomotive cab, a plurality of driving axles having attached traction wheels, a truck frame supported on the axles and having a pair of longitudinally spaced transom portions and side portions having centrally located upstanding thrust transmitting portions extending longitudinally between the transom portions, separate axle traction motors, each motor having a nose supported on a transom portion and also adapted to be supported on and connected in driving relation to an adjacent axle, a truck bolster having a cup shaped center bearing portion for pivotally receiving the center bearing of a locomotive cab and leg portions extending diagonally outwardly from the center bearing portion and transversely over the side portions of the truck frame adjacent opposite ends of each thrust transmitting portion of the frame and equidistant from the bolster center plate portion, and suspension means connected to the sides of the truck frame for suspending the outer ends of the bolster legs for transverse swinging movement relative to the truck frame.

4. In a traction truck for a locomotive cab, a plurality of driving axles having attached traction wheels, a truck frame supported on the axles and having a pair of longitudinally spaced transom portions and side portions having centrally located upstanding thrust transmitting portions extending longitudinally between the transom portions, traction motors suspended from the frame transom portions and adapted to be supported on and connected in driving relation to an adjacent driving axle, and a truck bolster having a cup shaped center bearing portion for pivotally receiving the center bearing of a locomotive cab and leg portions extending diagonally from the center bearing portion and projecting transversely over the side portions of the frame adjacent opposite ends of the thrust transmitting portions thereon to limit longitudinal movement of the bolster relative to the frame and to transmit the driving thrust of the traction motors from the truck frame to the bolster legs ahead of the bolster center bearing portion, said bolster having side abutments engageable with the frame side portions to limit transverse movement of the bolster relative to the side frame.

5. In a traction truck for a locomotive cab, a plurality of driving axles having attached traction wheels, a unitary truck frame supported on the axles and having longitudinally spaced transom portions and side portions provided with centrally located upstanding thrust transmitting portions extending longitudinally between the transom portions and upstanding bosses located adjacent the diagonally opposite ends of the upstanding thrust transmitting portions, a truck bolster having a centrally located cup shaped center bearing portion for pivotally receiving and carrying the center bearing of a locomotive cab and legs extending equidistant diagonally from the center bearing portion over the frame side portions longitudinally outwardly of the thrust transmitting portions thereon each of said bolster legs having a longitudinally inwardly facing thrust surface engageable with one end of the thrust transmitting portion of the truck frame, said bolster having side portions engageable with the inside of the side frame portions to limit relative transverse movement of the bolster relative to the frame, and detachable legs on the upstanding bosses on the frame extending over diagonal legs of the bolster to limit vertical separating movement of the bolster and frame.

6. In a locomotive traction truck, end and center driving axles having attached traction wheels, a unitary truck frame supported on the axles and having transom portions intermediate the center and each end axle and side portions having upstanding thrust portions located adjacent the ends of the transom portions, links pivoted at the upper ends for transverse swinging movement on the outer sides of the frame side portions intermediate the center and each end axle, spring planks pivoted at the ends on the lower end of the links, each spring plank extending below a transom portion and having helical springs supported in seats on the ends, a truck bolster having a central cup shaped center bearing portion and legs extending radially outwardly therefrom over the side frame portions alongside the outer ends of the thrust portions thereon and supported by seats in the ends thereof on the springs, the bolster legs having side projections engageable with the frame side portions to limit transverse movement of the bolster relative to the side frame, and means removably secured on said truck frame side portions and extending over the ends of diagonally opposite bolster legs to limit relative vertical separating movement between the truck frame and bolster.

7. In a locomotive, a cab having longitudinally spaced cylindrical center bearings, traction trucks, each truck having driving axles and attached traction wheels, side frame portions supported on said driving axles and transom portions extending transversely between said side portions adjacent opposite end driving axles, said side frame portions having upstanding longitudinally outwardly facing thrust surfaces adjacent each frame transom portion, a traction motor having a nose suspended on each transom portion and adapted to be supported on and connected in driving relation to a separate driving axle, and a truck bolster having a longitudinally extending intermediate portion and end portions extending transversely over the frame side portions alongside the thrust surfaces thereon for engagement therewith to receive the driving thrust exerted by the traction motors on said truck frame, said longitudinally extending intermediate portion of each truck bolster having a recessed cylindrical center bearing intermediate the end portions of said bolster to pivotally receive and support one of said cab center bearings and to transmit the driving thrust of said motors from the truck bolsters to said cab.

8. In a locomotive truck, a truck frame, a pair of driving axles having traction wheels thereon and outer end journals, journal boxes on said axle journals, a unitary truck frame having side frame portions provided with vertical pedestal jaws adjacent the ends to receive the journal boxes and transom portions extending transversely between the side frame portions longitudinally inwardly of the end driving axles, a traction motor having a nose supported on a transom portion and adapted to be supported on and operatively connected to a separate driving axle to drive said axle and to be driven thereby, hangers pivoted at their upper ends to the outer sides of the frame side portions adjacent the ends of the transom portions for transverse swinging movement, separate spring planks pivoted at their ends to the lower ends of the hangers, springs on the ends of the hangers, and a bolster having end portions extending over the side frame portions and supported on said springs and a longitudinally extending portion between said bolster end portions having a depressed cylindrical center bearing intermediate said end portions to pivotally receive and support a locomotive cab center bearing, said frame side portions having upstanding projections projecting upwardly between the bolster end portions and engageable endwise therewith to transmit the longitudinal driving force exerted on said truck frame by said motors to said bolster when said motors are driving and being driven by said axles.

9. In a locomotive vehicle, a locomotive cab having bolsters adjacent the ends, each bolster being provided with a downwardly projecting cylindrical center bearing of cylindrical form, draft gear means on the ends of said cab, a plurality of traction trucks each including end and intermediate driving axles having traction wheels thereon and journals on the ends thereof, journal boxes on the axle journals, a unitary truck frame having side portions provided with downwardly extending pedestal jaw portions enclosing the journal boxes for the end and intermediate driving axles and transom portions disposed between adjacent axles, said side frame portions also having upstanding frictional thrust surfaces disposed adjacent each transom portion and facing longitudinally outwardly toward each transom portion, a traction motor supported between each transom portion and an adjacent driving axle and connected in driving relation thereto to transmit driving thrust to the truck frame through the journal boxes and pedestal jaw portions of the truck side frame portions, supporting means including helical springs on said side frame portions, and a truck bolster supported on said springs and having a hollow cylindrical center bearing pivotally supporting a center bearing portion of one of the cab bolsters, said truck bolster having opposite end extensions, each of said bolster and extensions extending transversely alongside the thrust surfaces on the side frame portions for frictional engagement thereby to transmit the driving thrust of the traction motors to the bolster ahead of the bolster center bearing portion, each of said downwardly extending cylindrical center bearings of said locomotive cab bolsters being pivoted in one of said hollow cylindrical center bearings of each truck bolster to transmit longitudinal thrusts of the traction motors therebetween.

References Cited in the file of this patent

UNITED STATES PATENTS

| Number | Name | Date |
| --- | --- | --- |
| 1,046,153 | Doerr | Dec. 3, 1912 |
| 1,213,252 | Pilcher | Jan. 23, 1917 |
| 1,409,079 | Christianson | Mar. 7, 1922 |
| 1,740,150 | Blunt | Dec. 17, 1929 |
| 2,084,891 | Cease | June 22, 1937 |
| 2,184,102 | Piron | Dec. 19, 1939 |
| 2,189,125 | Blomberg | Feb. 6, 1940 |
| 2,238,593 | Kjolseth | Apr. 15, 1941 |
| 2,336,661 | Williams | Dec. 14, 1943 |
| 2,347,500 | Parke | Apr. 25, 1944 |
| 2,434,287 | Pflager | Jan. 13, 1948 |